March 28, 1950     A. J. BENT     2,501,706
FLUID PRESSURE COMPRESSOR GOVERNOR
Filed April 1, 1947
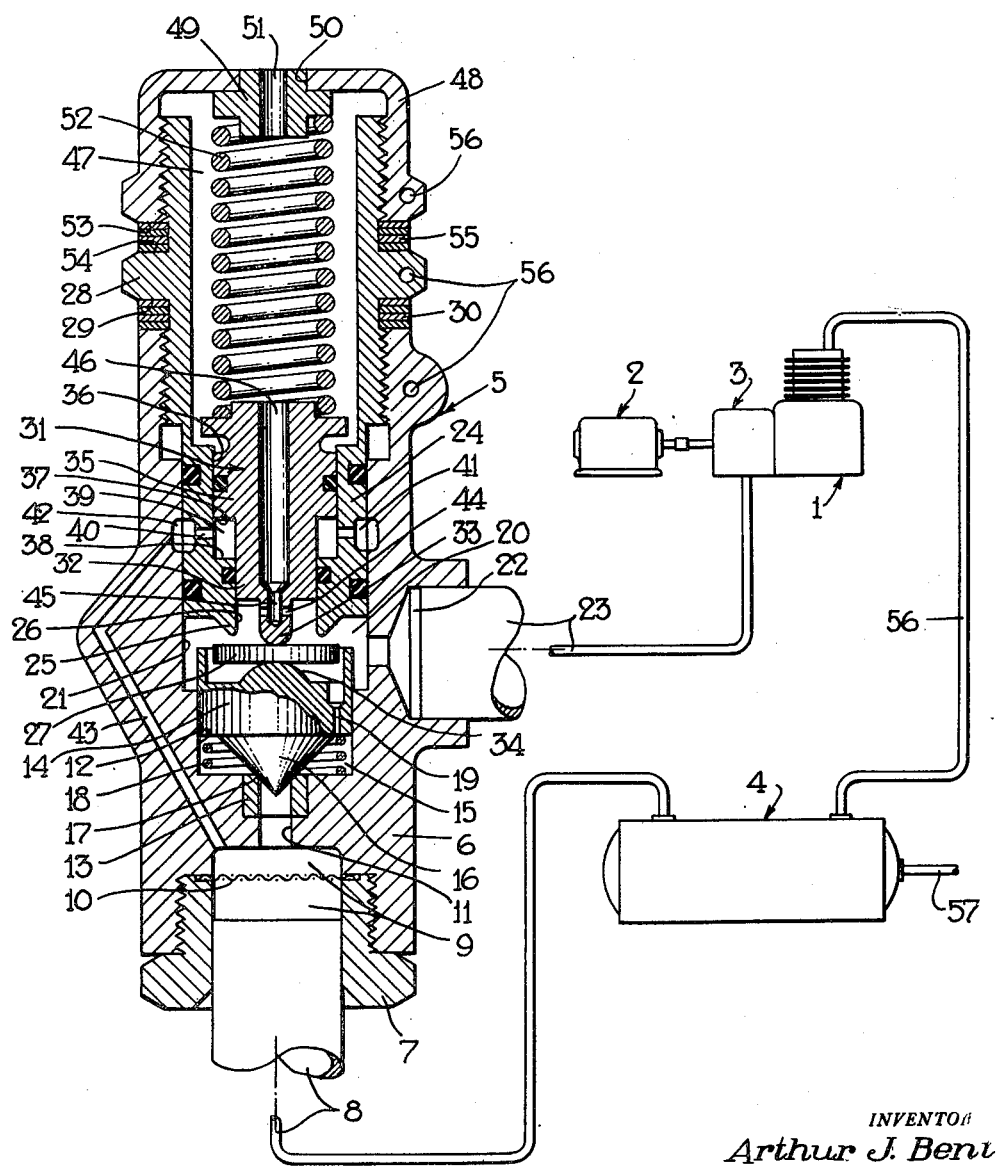
INVENTOR
Arthur J. Bent
BY Frank E. Miller
his ATTORNEY Patented Mar. 28, 1950

2,501,706

UNITED STATES PATENT OFFICE 2,501,706

FLUID PRESSURE COMPRESSOR GOVERNOR

Arthur J. Bent, Penn Township, Allegheny County, Pa., assignor to The Westinghouse Air Brake Company, Wilmerding, Pa., a corporation of Pennsylvania Application April 1, 1947, Serial No. 738,762

8 Claims. (Cl. 277—21)

This invention relates to fluid pressure governors and more particularly to the type for controlling operation of a device such as a fluid compressor.

In a system comprising a fluid compressor for supplying fluid under pressure to a receiver such as a reservoir, where the demand of said supply is not continuous, it is desirable to provide a clutch device for engaging and disengaging the compressor from a driving motor which may continue to run thereby saving compressor wear.

In order to render the clutch device automatically operative to reflect the change in demand for fluid under pressure supplied by the compressor, governor means must be provided for controlling said clutch device according to said demand.

It is therefore one object of this invention to provide an improved governor means particularly adapted for, though not limited to, controlling a clutch device, as above described.

This object is attained by providing the compressor system with governor means in the form of a fluid pressure controlled valve device which automatically responds to pressure of fluid in the reservoir to control supply and release of fluid under pressure to and from the clutch device for effecting engagement and disengagement thereof.

Referring to the accompanying drawing:

The single figure is a diagrammatic view, partly in outline and partly in section, of a fluid compressor system embodying governor means constructed in accordance with the invention.

Description

As shown in the drawing, the reference numeral 1 designates a fluid compressor which is adapted to be driven by any suitable means, such as a motor 2, through a fluid pressure released clutch device 3 to supply fluid under pressure to a fluid pressure reservoir 4. A governor valve device 5, embodying the invention, is provided for controlling supply of fluid under pressure to and its release from the clutch device 3.

The governor valve device 5 comprises a casing having a body portion 6 which is provided with a removable fitting 7 for connection with a fluid pressure pipe 8 which opens an inlet opening 9, formed in the portion 6, with the reservoir 4. A strainer 10 is inserted in the opening 9 for cleaning the fluid under pressure entering therethrough.

A small central bore 11 connects the inlet opening 9 with a larger central bore 12 formed in body portion 6. A removable valve seat bushing 13 is inserted in a recess open to bore 11 opposite to a supply valve 14 which is slidably mounted in the bore 12. A valve chamber 15 is formed in the bore 12 between the supply valve 14 and seat bushing 13. A central conical valve portion 16 projects from the valve 14 into the chamber 15 for cooperation with a tapered annular shoulder 17 formed in the bushing 13 for controlling flow of fluid under pressure from inlet opening 9 to the valve chamber 15 by way of the bore 11. A bias spring 18 is disposed in the chamber 15 for urging the valve 14 away from the bushing 13, and a restricted opening 19 extends through said valve 14 for connecting the chamber 15 with a chamber 20 at the opposite side of said valve and formed in the interior of a still larger central bore 21 in the casing body portion 6. A control opening 22 is also formed in the portion 6 extending outwardly therethrough from chamber 20 for connection with a control pipe 23 leading to the clutch device 3.

An adjustable sleeve seat member 24, having a screw-threaded attachment with one end of the casing body portion 6 projects into the bore 21 in slidable relationship with the wall thereof. An annular seat rib 25 is formed on the member 24 around a central bore 26 in said member and projects into the chamber 20 to cooperate with a disc-shaped exhaust valve 27 for controlling communication between the chamber 20 and the sleeve member bore 26.

The seat member 24 is adjustable toward and way from the exhaust valve 27, and a seat member rib 28 forms a shoulder 29 for cooperation with removable and insertable shims 30 clamped between said shoulder and the end of the casing body portion 6 to define stop limits for said adjustable movement.

A valve actuating piston member 31 is slidably disposed in the member 24. The piston member 31 has a portion 32 which fits in the sleeve member bore 26, which portion 32 is provided with a centrally projecting member 33 for, preferably, point contact with one side of the release valve 27, the opposite side of which has, preferably, point contact with a curved surface 34 on the supply valve 14. The piston member 31 has a portion 35 of larger diameter than the portion 32, which fits in a sleeve member bore 36 of larger diameter than the sleeve member bore 26. An annular shoulder 38 is formed in the seat sleeve member 24 at the junction of bores 26 and 36, and the corresponding shoulder in the piston member 31 at the junction of portions 32 and 35 thereof forms a piston face 37 spaced away from and opposite to the shoulder 38, thereby forming two end walls of a pressure chamber 39 encircling the piston member portion 32 within the sleeve member 24. A passage 40 in the member 24 opens the chamber 39 with a relatively wide annular groove 41 formed also in said member 24. A corresponding similar groove 42 is formed in the casing body portion 6 for registry with the groove 41. The grooves 41 and 42 are relatively wide in order to insure registry therebetween at a plurality of longitudinal positions to which the seat sleeve member 24 may be adjusted relative to the casing body portion 6. A passage 43 is formed in the body portion 6 which connects the groove 42 with the inlet opening 9.

Ports 44 in the centrally projecting member 33 of piston member 31 connect chamber 20 with a restricted opening 45 in said member which opening in turn opens into a larger opening 46 which extends therefrom through the piston member 31 longitudinally and centrally thereof to open into an atmospheric spring chamber 47 formed within the adjustable seat sleeve member 24 and closed at its outer end by a cap member 48 and at the opposite end by the piston member 31. A removable orifice member 49 is inserted in a central bore 50 in the member 48 and an opening 51 extends through said member 49 to open the chamber 47 to the atmosphere. A control spring 52 is disposed in the spring chamber 47 between the orifice member 49 in cap member 48 and the piston member 31, for urging said member 31 away from said cap member toward the exhaust and supply valves 27 and 14.

The cap member 48 has a screw-threaded attachment with the end of the adjustable seat sleeve member 24. An annular shoulder 53 is formed at the end of member 48 which is disposed opposite to a corresponding shoulder 54 formed on the rib 28 of sleeve member 24. Shims 55, similar to the shims 30, are clamped between the shoulders 53 and 54 to define a position of the cap member 48 relative to the seat sleeve member 24 which provides a selected degree of initial compression of the control spring 52.

Openings 56 are provided in the cap member 48, sleeve member 24, and body portion 6 respectively, through which openings a wire (not shown) may be threaded and twisted together at its ends for locking the above named parts in their relative adjusted positions.

A pipe 56' opens the compressor 1 to the reservoir 4, and a pipe 57 opens the reservoir to a device (not shown) to be actuated.

*Operation*

With the parts of the governor valve device 5 positioned as shown in the drawing, the piston member 31 is urged against the release valve 27 which thereby is urged away from the seat rib 25 into contact with the supply valve 14 which in turn forces the conical portion 16 thereof to a position seated against the shoulder 17 of bushing 13. The seated supply valve 14 is thus closing off the inlet opening 9 from the valve chamber 15, thereby preventing supply of fluid under pressure from the reservoir to the clutch device 3, while the unseated exhaust valve 27 is allowing open communication between the chamber 20 and the atmospheric spring chamber 47 by way of ports 44, restricted opening 45 and opening 46 in the piston member 31. The fluid pressure released clutch device 3 is thus open to the atmosphere by way of the control pipe 23 and control opening 22 connected to the chamber 20 of the governor valve device 5 and is therefore effective to operatively connect the compressor 1 to motor 2.

Now assume that the reservoir pipe 57 is closed and that the compressor is being driven by the motor 2 by way of the clutch device 3. Fluid under pressure is therefore being supplied to the reservoir 4 where the pressure of fluid is thereby increasing.

The increasing pressure of fluid in the reservoir 4 is communicated to the inlet opening 9 of the valve device 5, and therefrom to the pressure chamber 39 and to the bore 11, which are open to said chamber 9, as previously described, where the increasing pressure of reservoir fluid exerts an increasing force on the annular face 37 of the member 31 exposed within the chamber 39, and on the portion of the conical portion 16 of the supply valve 14 which is exposed to the interior of the bore 11 within the bounds of the seat shoulder 17.

Both of the above increasing forces act on the member 31, one directly on the face 37 of said member and the other indirectly by way of the supply valve 14 and exhaust valve 27 to oppose the force of the control spring 52 acting also on said member 31.

When these increasing forces are increased to a degree which together is greater than the opposing force of the control spring 52, the member 31, exhaust valve 27 and supply valve 14 move upwardly, as viewed in the drawing.

Upon the initial movement of the above parts, the conical portion 16 of the supply valve 14 unseats from the shoulder 17, allowing fluid under pressure to flow from the inlet opening 9 into the valve chamber 15 by way of the bore 11, whereby a greater undersurface area of the valve 14 is exposed to the increased pressure of fluid from the inlet opening 9.

At this time, the chamber 20 at the opposite side of the valve 14 is yet at substantially atmospheric pressure and the restricted opening 19 through said valve so restricts flow of fluid under pressure from chamber 15, that a relatively great differential in pressure of fluid is promptly obtained across said valve, which acts to snap said supply valve, the exhaust valve 27 and member 31 rapidly upward, as viewed in the drawing, against action of the spring 52, to seat the exhaust valve 27 on the annular seat rib 25. The force of the supply valve 14 exerted against the underside of the exhaust valve 27 is transmitted by point contact therewith, which contact allows the valve 27 freedom for proper seating alignment on the rib 25.

Upon seating of the release valve 27, the chamber 20 is disconnected from atmosphere by way of bore 46 in piston member 31 and due to flow of fluid under pressure from the valve chamber 15 through the restricted opening 19 in the supply valve 14 to the chamber 20, a differential of pressures of fluid is thus established across the exhaust valve 27 between the chamber 20 and the bore 26, which remains at atmospheric pressure, which differential causes a force to act on said valve which persists to maintain said valve seated during prevailing conditions of increased pressure of reservoir fluid in the system.

Fluid under pressure supplied to the chamber 20, as above described, flows through the control opening 22 to the control pipe 23 to supply fluid under pressure to the clutch device 3 which device responds to such supply of fluid under pressure to disengage the compressor device 1 from the driving means. The compressor 1 then rests while the driving means may continue to run, but fluid under pressure is no longer delivered by the compressor to the reservoir 4 and the pressure of fluid in the reservoir and communicating parts of the system is therefore limited to a predetermined value as governed by adjustment of the valve device 5.

When pressure of fluid in chamber 20 equalizes with pressure of fluid in chamber 15, supply valve 14 may have a tendency to move away from exhaust valve 27, when in a vertical position as viewed in the drawing, for example, but is prevented from so doing by action of spring 18.

Now assume that there is a demand for fluid under pressure from the reservoir 4 to an anonymous fluid pressure device (not shown) to be controlled or actuated, the supply pipe 57 is opened to convey said fluid under pressure to said device. As fluid under pressure is thus supplied to the pipe 57 from the reservoir 4, the pressure of fluid in the reservoir 4 decreases, and the pressure of fluid in the connected pressure chambers 20 and 39 in the governor device 5 correspondingly decreases.

The force of the pressure of fluid acting on the underside of the exhaust valve 27 therefore decreases as well as the force acting on the face 37 of the piston member 31 which remains in contact with said valve 27 by action of the control spring 52, restrained from downward movement by the above forces opposing action of said spring.

When the pressure of fluid in the chambers 39 and 20 is thus reduced in sufficient degree, the sum of the resulting forces thereof acting, as above described, to oppose the action of control spring 52 becomes less than the force of said spring and the member 31, exhaust valve 27, and supply valve 14 are thereby moved downwardly, as viewed in the drawing.

Upon initial downward movement of the above, the exhaust valve 27 is unseated from the rib 25, thereby permitting rapid substantial equalization of the pressures of fluid on both sides of said exhaust valve 27, which equalization of pressures destroys the previously described restraining force acting to oppose the action of spring 52 on member 31 which now moves rapidly downward, forcing the supply valve 14 to reseat on the annular shoulder 17 in a snap acting manner. The inlet opening 9 in the valve device 5 is thus again closed to the chamber 15 and chamber 20 by the reseated supply valve 14, and said chambers are again open to atmosphere by way of the sleeve member bore 26 past the unseated exhaust valve 27.

Fluid under pressure now flows from the fluid pressure released clutch device 3 to the atmosphere by way of the control pipe 23, the opening 22 in the valve device 5 and the chamber 20, bore 26 in member 31, ports 44, restricted opening 45, and bore 46 in the member 31, chamber 47 in member 24, and the opening 51 in member 49. In absence of fluid under pressure, the clutch device 3 responds to engage the compressor 1 with the driving means and the compressor is again brought into operation. Fluid under pressure is thereby again supplied to the reservoir 4 where the pressure of fluid is thus increased.

It will be appreciated that the valve device 5 will again act as a governor means for automatically stopping and starting the compressor in response to demand for fluid under pressure therefrom in the same manner as above described.

For the sake of simplifying the following description the pressure of reservoir fluid at which the valve device 5 responds to supply fluid under pressure to the clutch device 3 for prompting said device 3 to disengage the compressor 1 from the motor 2 will be called "cut-out pressure." Similarly, the pressure of reservoir fluid at which the valve device 5 responds to exhaust fluid under pressure from the clutch device 3 for prompting said device 3 to engage the compressor 1 with the motor 2 will be called "cut-in pressure."

The governor valve device 5 is provided with adjustable means for changing the cut-out and cut-in pressures.

For a first example, if it is desired to raise the cut-out and cut-in pressures without changing the range between these pressures, shims 55 may be removed, in number proportional to the degree of change in said pressures desired.

Removal of a shim or shims 55 allows the cap member 48 to be advanced further onto the sleeve member 24, thereby further initially compressing the control spring 52 between said member and the piston member 31. The spring 52 therefore causes a greater force to act on the supply valve 14 so as to require a proportionately greater cut-out pressure to unseat said supply valve. Similarly, the increased initial compression of spring 52 causes a greater force to act against the exhaust valve 27 which, when seated on the rib 25, will be unseated at a correspondingly greater cut-in pressure. The addition of one or more shims 55 will lower the cut-out and cut-in pressures as will be apparent from the above description.

For a second example, if it is desired to raise the cut-out pressure without changing the cut-in pressure, shims 30 may be removed, in number proportional to the degree of change in pressure response desired.

Removal of one or more shims 30 allows the seat sleeve member 24 and attached cap member 48 to be advanced in the direction of the body portion 6. In so doing, the control spring 52 is further initially compressed between cap member 48 and piston member 31, and the annular seat rib 25 of member 24 is moved closer to the exhaust valve 27. Again, as described in relation with removal of shims 55, a greater cut-out pressure is therefore required before the increased initial compression force of the spring 52 is overcome. However, as was not true in the previous example, the exhaust valve 27 now travels a proportionately shorter distance to seat on the rib 25 and because of this the spring 52 is compressed to a lesser extent during the travel. This reduction in travel compression equals the increase in initial compression so that the final total compression of spring 52 acting on the seated exhaust valve 27 is the same as before removal of any shims 30 so that there will be no change in the cut-out pressure at which said valve will be unseated.

Conversely, if it is desired to lower the cut-out pressure without changing the cut-in pressure one or more shims 30 may be added, as will be apparent from the above description.

For a third example, if it is desired to increase the cut-in pressure without affecting the cut-out pressure, one or more shims 30 may be removed and an equal number of shims 55 added.

Removing shims 30 advances the cap member 48 and seat sleeve member 24 toward the exhaust valve 27, while the addition of an equal number of shims 55 moves the member 48 away from the valve 27 the same distance as advanced by the removal of shims 30, so that the effect of such shim manipulation is to advance the seat rib 25 closer to the release valve 27 without affecting the initial compression of the spring 52. The supply valve 14 will then unseat at the same cut-out pressure as before the change in shims, the exhaust valve 27 will travel a shorter distance to seat on the advanced rib 25, the final total compression of spring 52 will be less, and the exhaust valve 27 thereby will unseat at a higher cut-in pressure.

From the above description it will also be apparent that the addition of one or more shims 30 and removal of a like number of shims 55 will reduce the cut-in pressure without changing the cut-out pressure.

*Summary*

From the above description it will now be seen that I have provided an improved governor device which is relatively simple in construction and positively movable, with a snap action, to its different positions for controlling operation of a selected device. The governor device may be adjusted to operate at any desired cut-in and/or cut-out pressures by proper adjustment of the adjusting means, i. e. by use of the proper number of shims 30 and 55, as above described.

Having now described my invention, what I claim as new and desire to secure by Letters Patent, is:

1. A valve device comprising a casing having a fluid pressure inlet and a fluid pressure outlet, a control spring, a piston subject to opposing pressure of said spring and of fluid in said inlet, a supply valve controlling communication between said inlet and outlet, an exhaust valve movable with said supply valve controlling communication between said outlet and atmosphere, and means for opening said supply valve and closing said exhaust valve against opposition of said spring upon movement of said piston by fluid under pressure, said spring being operative to open said exhaust valve and close said supply valve upon a reduction in the force of pressure of fluid on said piston to a degree less than the force of said spring.

2. A valve device comprising a casing having a fluid pressure inlet and a fluid pressure outlet, a control spring, a piston subject to opposing pressure of said spring and of fluid in said inlet, a supply valve comprising an enlarged portion slidably mounted in the casing and having a pressure chamber at one side, and a valve portion disposed in said chamber for controlling communication between said chamber and said inlet, a restricted port connecting said chamber to the opposite side of said enlarged portion and to said outlet, said casing having a valve seat, an exhaust valve movable with said supply valve and arranged to cooperate with said seat to close communication between said outlet and a restricted fluid pressure exhaust passage, means operative by said piston upon pressure of said spring on said piston exceeding the opposing pressure of fluid in said inlet to open said exhaust valve and close said supply valve, and means for opening said supply valve and closing said exhaust valve upon movement of said piston by pressure of fluid against said spring.

3. A valve device comprising a casing member having a fluid pressure inlet and a fluid pressure outlet and a supply valve seat disposed in a communication between said inlet and said outlet, an element mounted in said casing member having an exhaust valve seat facing said supply valve seat and arranged in coaxial relation therewith in a fluid pressure exhaust communication between said outlet and a fluid pressure exhaust passage, a valve member comprising an enlarged portion slidably mounted in said casing between said valve seats and subject on one side to pressure of fluid in said outlet, and a supply valve associated with the opposite side of said enlarged portion for cooperation with said supply valve seat to close the respective communication, an exhaust valve associated with the opposite side of said enlarged portion for cooperation with said exhaust valve seat to close communication between said outlet and fluid pressure exhaust passage, a restricted communication between opposite sides of said enlarged portion, a piston slidably mounted in said element constantly subject on one side to pressure of fluid in said inlet, a regulating spring acting on said piston in opposition to pressure of fluid, means operable by said piston upon movement thereof by said spring to open said exhaust valve and to close said supply valve, and means operable to open said supply valve and close said exhaust valve upon movement of said piston against said spring.

4. A valve device comprising a casing member having a fluid pressure inlet and a fluid pressure outlet and a supply valve seat disposed in a communication between said inlet and said outlet, an element mounted in said casing member having an exhaust valve seat facing said supply valve seat and arranged in coaxial relation therewith in a fluid pressure exhaust communication between said outlet and a fluid pressure exhaust passage, a valve member comprising an enlarged portion slidably mounted in said casing between said valve seats and subject on one side to pressure of fluid in said outlet, and a supply valve associated with the opposite side of said enlarged portion for cooperation with said supply valve seat to close the respective communication, an exhaust valve associated with the opposite side of said enlarged portion for cooperation with said exhaust valve seat to close communication between said outlet and fluid pressure exhaust passage, a restricted communication between opposite sides of said enlarged portion, a piston slidably mounted in said element constantly subject on one side to pressure of fluid in said inlet, a regulating spring acting on said piston in opposition to pressure of fluid, means operable by said piston upon movement thereof by said spring to open said exhaust valve and to close said supply valve and means operable to open said supply valve and close said exhaust valve upon movement of said piston against said spring, said element being adjustable relative to said casing member axially of said supply valve seat, and means for effecting such adjustment.

5. A valve device comprising a casing member having a fluid pressure inlet and a fluid pressure outlet and a supply valve seat disposed in a communication between said inlet and said outlet, an element mounted in said casing member having an exhaust valve seat facing said supply valve seat and arranged in coaxial relation therewith in a fluid pressure exhaust communication between said outlet and a fluid pressure exhaust passage, a valve member comprising an enlarged portion slidably mounted in said casing between said valve seats and subject on one side to pressure of fluid in said outlet, and a supply valve associated with the opposite side of said enlarged portion for cooperation with said supply valve seat to close the respective communication, an exhaust valve associated with the opposite side of said enlarged portion for cooperation with said exhaust valve seat to close communication between said outlet and fluid pressure exhaust passage, a restricted communication between opposite sides of said enlarged portion, a piston slidably mounted in said element constantly subject on one side to pressure of fluid in said inlet, a regulating spring in said element having one end bearing against said piston in opposition to pressure of fluid on said piston, a cap member adjustably connected to said element supporting the opposite end of said spring, means for adjusting said cap member relative to said element for varying pressure of said spring on said piston, means operable by said piston upon movement thereof by said spring to open said exhaust valve and to close said supply valve, and means operable to open said supply valve and to close said exhaust valve upon movement of said piston against said spring.

6. A valve device comprising a casing member having a fluid pressure inlet and a fluid pressure outlet and a supply valve seat disposed in a communication between said inlet and said outlet, an element mounted in said casing member having an exhaust valve seat facing said supply valve seat and arranged in coaxial relation therewith in a fluid pressure exhaust communication between said outlet and a fluid pressure exhaust passage, a valve member comprising an enlarged portion slidably mounted in said casing between said valve seats and subject on one side to pressure of fluid in said outlet, and a supply valve associated with the opposite side of said enlarged portion for cooperation with said supply valve seat to close the respective communication, an exhaust valve associated with the opposite side of said enlarged portion for cooperation with said exhaust valve seat to close communication between said outlet and fluid pressure exhaust passage, a restricted communication between opposite sides of said enlarged portion, a piston slidably mounted in said element constantly subject on one side to pressure of fluid in said inlet, a regulating spring in said element having one end bearing against said piston in opposition to pressure of fluid on said piston, a cap member adjustably connected to said element supporting the opposite end of said spring, means for adjusting said cap member relative to said element for varying pressure of said spring on said piston, said element being adjustable relative to said casing member axially of said supply valve seat, means for adjusting said element relative to said casing member, means operable by said piston upon movement thereof by said spring to open said exhaust valve and to close said supply valve, and means operable to open said supply valve and to close said exhaust valve upon movement of said piston against said spring.

7. A valve device comprising a casing member having a fluid pressure inlet, a fluid pressure outlet and a supply valve seat disposed in a communication between said inlet and outlet, an element mounted in said casing comprising an exhaust valve seat having a restricted opening with the atmosphere, said element facing and arranged in coaxial relation with said supply valve seat, a valve member comprising an enlarged portion slidably mounted in said casing between said seats and a supply valve associated with one side arranged to cooperate with said supply valve seat to close communication between said inlet and said one side of said enlarged portion, a restricted passage connecting said one side of said enlarged portion to the opposite side thereof and to said outlet, a convex surface on the opposite side of said enlarged portion, a disk exhaust valve carried by said surface for cooperation with said exhaust valve seat, a piston slidably mounted in said element having a projection extending through said exhaust valve seat for unseating engagement with said exhaust valve, a regulating spring acting on said piston in a direction to unseat said exhaust valve and to seat said supply valve, means for conveying fluid under pressure from said inlet to act on said piston in opposition to pressure of said spring, and another spring acting in a direction to unseat said supply valve and to seat said exhaust valve.

8. A valve device comprising a casing member having a fluid pressure inlet, a fluid pressure outlet, and a supply valve seat, an element adjustably mounted in said casing coaxially of said seat and having an exhaust valve seat arranged opposite to and spaced from said supply valve seat, shims interposed between said member and element for defining the spacing of said exhaust valve seat relative to said supply valve seat, a piston slidably mounted in said element comprising a portion projecting through said exhaust valve seat and a passage extending axially therethrough for releasing fluid under pressure exhausted past said exhaust valve seat, a spring in said element having one end acting on said piston to urge it in the direction of said seats, a spring seat adjustably connected to said element supporting the opposite end of said spring, shims interposed between said element and spring seat for adjusting said spring seat relative to said element, said piston comprising a face constantly subject to pressure of fluid in said inlet opposing pressure of said spring, a supply valve comprising an enlarged portion slidably mounted in said casing between said supply and exhaust valve seats, means connecting said outlet to one side of said enlarged portion and to said exhaust valve seat, an exhaust valve associated with said one side of said enlarged portion arranged to cooperate with said exhaust valve seat and to be unseated therefrom by the projecting portion of said piston upon movement of said piston by said spring, a supply valve portion associated with the opposite side of said enlarged portion for cooperation with said supply valve seat, a spring acting on said enlarged portion urging it in a direction to open said supply valve and to close said exhaust valve, and a restricted communication connecting opposite sides of said enlarged portion.

ARTHUR J. BENT.

REFERENCES CITED

The following references are of record in the file of this patent:

UNITED STATES PATENTS

| Number | Name | Date |
| --- | --- | --- |
| 1,932,039 | Hewitt | Oct. 24, 1933 |
| 1,965,070 | Cumming | July 3, 1934 |
| 2,191,726 | Peters | Feb. 27, 1940 |